(12) United States Patent
Wu et al.

(10) Patent No.: US 11,902,814 B2
(45) Date of Patent: Feb. 13, 2024

(54) CONTROL INFORMATION TRANSMISSION METHOD AND APPARATUS

(71) Applicant: Huawei Technologies Co., Ltd., Shenzhen (CN)

(72) Inventors: Ji Wu, Shanghai (CN); Jianqin Liu, Beijing (CN); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 398 days.

(21) Appl. No.: 17/371,957

(22) Filed: Jul. 9, 2021

(65) Prior Publication Data

US 2021/0337416 A1   Oct. 28, 2021

Related U.S. Application Data

(63) Continuation of application No. PCT/CN2020/071664, filed on Jan. 13, 2020.

(30) Foreign Application Priority Data

Jan. 11, 2019  (CN) .......................... 201910028189.8

(51) Int. Cl.
*H04B 7/00* (2006.01)
*H04W 24/10* (2009.01)
*H04W 74/08* (2009.01)

(52) U.S. Cl.
CPC ....... *H04W 24/10* (2013.01); *H04W 74/0808* (2013.01)

(58) Field of Classification Search
CPC .......................... H04W 24/10; H04W 74/0808
See application file for complete search history.

(56) References Cited

U.S. PATENT DOCUMENTS

| | | |
|---|---|---|
| 10,405,250 B2 | 9/2019 | Li et al. |
| 11,101,964 B2 | 8/2021 | Lyu et al. |
| 2020/0153498 A1* | 5/2020 | Kotecha ............... H04B 7/0695 |

FOREIGN PATENT DOCUMENTS

| | | |
|---|---|---|
| CN | 101631322 A | 1/2010 |
| CN | 102448078 A | 5/2012 |
| CN | 104284349 A | 1/2015 |
| CN | 104486792 A | 4/2015 |
| CN | 107864517 A | 3/2018 |

(Continued)

OTHER PUBLICATIONS

Huawei, HiSilicon, "Initial access in NR unlicensed", 3GPP TSG RAN WG1 Meeting #95, R1-1812195, Nov. 12-16, 2018, 10 pages, Spokane, USA.

(Continued)

*Primary Examiner* — Erika A Washington
(74) *Attorney, Agent, or Firm* — Slater Matsil, LLP

(57) ABSTRACT

Embodiments of this application provide a control information transmission method. The method includes: User equipment UE sends report information to a base station, where the report information includes a detection result of one or more downlink reference signals of the UE or a status of a timer/counter corresponding to the one or more downlink reference signals; the UE receives feedback information from the base station, where the feedback information includes sending status information of the one or more downlink reference signals.

20 Claims, 12 Drawing Sheets

(56) References Cited

FOREIGN PATENT DOCUMENTS

| CN | 108631993 | A  | 10/2018 |
|----|-----------|----|---------|
| WO | 2011130665 | A1 | 10/2011 |
| WO | 2016053173 | A1 | 4/2016  |
| WO | 2018156435 | A1 | 8/2018  |

OTHER PUBLICATIONS

Ericsson, "Handling LBT failures", 3GPP TSG-RAN WG2 #104, TDoc R2-1817969 , Nov. 12-16, 2018, 3 pages, Spokane, Washington, USA.

SAMSUNG: "Initial Access and Mobilitiy Procedure for NR-U", 3GPP TSG RAN WG1 Meeting #95, R1-1812978, Nov. 12-16, 2018, 9 pages, Spokane, USA.

Vivo, "Evaluation of the RLM in NR-U", 3GPP TSG RAN WG2 Meeting #104, R2-1818270, (Resubmission of R2-1814267), Nov. 12-16, 2018, 8 pages, Spokane, USA.

\* cited by examiner

CONTROL INFORMATION TRANSMISSION METHOD AND APPARATUS

CROSS-REFERENCE TO RELATED APPLICATIONS

This application is a continuation of International Application No. PCT/CN2020/071664, filed on Jan. 13, 2020, which claims priority to Chinese Patent Application No. 201910028189.8, filed on Jan. 11, 2019. The disclosures of the aforementioned applications are hereby incorporated by reference in their entireties.

TECHNICAL FIELD

This application relates to the field of communications technologies, and in particular, to a control information transmission method and apparatus.

BACKGROUND

In an LTE system, user equipment (UE) continuously monitors a downlink reference signal configured by a base station for the UE, for example, a channel state information-reference signal (CSI-RS). The UE estimates a status of a link between the UE and the base station by using the downlink reference signal. When reference signal received power (RSRP) and/or reference signal received quality (RSRQ) of the downlink reference signal received by the UE are/is lower than a threshold, it is considered that the link between the base station and the UE fails. Subsequently, the UE needs to perform a random access process again to establish a connection to the base station.

FIG. 1 is a schematic diagram of a radio link monitoring process in an LTE system. The radio link monitoring (RLM) process in the LTE system is as follows: When RSRP/RSRQ of N310 CSI-RSs continuously monitored by UE are/is lower than a threshold, the UE starts a timer T310. If RSRP/RSRQ of consecutive N311 CSI-RSs are/is higher than the threshold before the timer T310 expires, it is considered that a radio link between the UE and a base station is recovered. Otherwise, it is considered that the radio link fails, and the base station needs to be reconnected to the UE. N310 and N311 are counters or values corresponding to different counters. A value of N310 may be 200 milliseconds (ms), and a value of N311 may be 100 ins. T310 is the timer. In some cases, T310 may alternatively indicate a value corresponding to the timer. A unit of T310 may be one second.

An RLM process in a 5G system is similar to that in the LTE system. Further, the 5G system supports communication on an unlicensed frequency band. A device working on the unlicensed frequency band may detect, without authorization, whether a channel is idle. When detecting that the channel is idle, the device may access the channel to work. To ensure coexistence with another device that works on the unlicensed frequency band, the device uses a listen before talk (LBT) channel contention access mechanism. Due to limitation of the LBT channel contention access mechanism, it cannot be ensured that a CSI-RS and an SS/PBCH block that are periodically configured are sent on a preset time-frequency resource. Consequently, the RLM process may not be normally performed.

SUMMARY

Embodiments of this application provide a control information transmission method. By using the method described in the embodiments of this application, UE can learn of a more accurate RLM result.

According to a first aspect, an embodiment of this application provides a control information transmission method. The method includes: User equipment UE sends report information to a base station, where the report information includes a detection result of one or more downlink reference signals of the UE or a status of a timer/counter corresponding to the one or more downlink reference signals; the UE receives feedback information from the base station, where the feedback information includes sending status information of the one or more downlink reference signals.

By using the method provided in this embodiment of this application, the UE can learn of a more accurate RLM result, and unnecessary reconnection is avoided, so that power consumption of the UE is reduced and system resource overheads are reduced.

In a possible design, when the UE does not detect the at least one downlink reference signal or energy of at least one detected downlink reference signal is lower than a threshold, the UE sends the report information to the base station.

In a possible design, the report information may be represented in a bitmap form or by using one-bit information.

In a possible design, the one-bit information is used to indicate whether the UE includes a downlink reference signal that is not correctly received, or is used to indicate whether the timer/counter corresponding to the one or more downlink reference signals is started.

In a possible design, the sending status information of the one or more downlink reference signals includes that at least one of the one or more downlink reference signals is not sent because LBT fails.

In a possible design, the method further includes: The UE updates the timer/counter corresponding to the one or more downlink reference signals.

The UE may perform more accurate timing/counting, and perform communication based on a timing/counting result. In other words, the UE may utilize the more accurate RLM result, to avoid the unnecessary reconnection.

In a possible design, the method further includes: The UE receives configuration information from the base station. The configuration information carries a parameter used to update the timer/counter corresponding to the one or more downlink reference signals.

Different services have different delay requirements. Therefore, timer/counter parameters may be configured for the UE based on different services, and the UE may perform more accurate timing/counting in different service scenarios.

In addition, reference signals configured for UEs in different groups are affected by the LBT to different degrees. Therefore, RLM parameters of the UEs in the different groups should also be differently configured, to compensate the different reference signals to different degrees.

According to a second aspect, an embodiment of this application provides a control information transmission method. The method includes: A base station receives report information from user equipment UE, where the report information includes a detection result of one or more downlink reference signals of the UE or a status of a timer/counter corresponding to the one or more downlink reference signals; the base station sends feedback information to the UE, where the feedback information includes sending status information of the one or more downlink reference signals.

By using the method provided in this embodiment of this application, the UE can learn of a more accurate RLM result, and unnecessary reconnection is avoided, so that power consumption of the UE is reduced and system resource overheads are reduced.

In a possible design, when the UE does not detect the at least one downlink reference signal or energy of at least one detected downlink reference signal is lower than a threshold, the base station receives the report information from the UE.

In a possible design, the report information may be represented in a bitmap form or by using one-bit information.

In a possible design, the one-bit information is used to indicate whether the UE includes a downlink reference signal that is not correctly received, or is used to indicate whether the timer/counter corresponding to the one or more downlink reference signals is started.

In a possible design, the sending status information of the one or more downlink reference signals includes that at least one of the one or more downlink reference signals is not sent because LBT fails.

In a possible design, the method further includes: The base station sends configuration information to the UE. The configuration information carries a parameter used to update the timer/counter corresponding to the one or more downlink reference signals.

According to a third aspect, an embodiment of this application provides a control information transmission apparatus. The apparatus includes: a sending module, configured to send report information to a base station, where the report information includes a detection result of one or more downlink reference signals of the apparatus or a status of a timer/counter corresponding to the one or more downlink reference signals; and a receiving module, configured to receive feedback information from the base station, where the feedback information includes sending status information of the one or more downlink reference signals.

In a possible design, when the apparatus does not detect the at least one downlink reference signal or energy of at least one detected downlink reference signal is lower than a threshold, the sending module sends the report information to the base station.

In a possible design, the report information may be represented in a bitmap form or by using one-bit information.

In a possible design, the one-bit information is used to indicate whether the apparatus includes a downlink reference signal that is not correctly received, or is used to indicate whether the timer/counter corresponding to the one or more downlink reference signals is started.

In a possible design, the sending status information of the one or more downlink reference signals includes that at least one of the one or more downlink reference signals is not sent because LBT fails.

In a possible design, the apparatus further includes: a processing module, configured to update the timer/counter corresponding to the one or more downlink reference signals.

In a possible design, the receiving module is further configured to receive configuration information from the base station. The configuration information carries a parameter used to update the timer/counter corresponding to the one or more downlink reference signals.

According to a fourth aspect, an embodiment of this application provides a control information transmission apparatus. The apparatus includes: a receiving module, configured to receive report information from user equipment UE, where the report information includes a detection result of one or more downlink reference signals of the UE or a status of a timer/counter corresponding to the one or more downlink reference signals; and a sending module, configured to send feedback information to the UE, where the feedback information includes sending status information of the one or more downlink reference signals.

In a possible design, when the UE does not detect the at least one downlink reference signal or energy of at least one detected downlink reference signal is lower than a threshold, the receiving module receives the report information from the UE.

In a possible design, the report information may be represented in a bitmap form or by using one-bit information.

In a possible design, the one-bit information is used to indicate whether the UE includes a downlink reference signal that is not correctly received, or is used to indicate whether the timer/counter corresponding to the one or more downlink reference signals is started.

In a possible design, the sending status information of the one or more downlink reference signals includes that at least one of the one or more downlink reference signals is not sent because LBT fails.

In a possible design, the sending module is further configured to send configuration information to the UE. The configuration information carries a parameter used to update the timer/counter corresponding to the one or more downlink reference signals.

According to a fifth aspect, a control information transmission apparatus is provided. The apparatus includes a module configured to perform the method in any one of the first aspect or the possible implementations of the first aspect, or a module configured to perform the method in any one of the second aspect or the possible implementations of the second aspect.

According to a sixth aspect, a communications apparatus is provided. The communications apparatus may be the base station or the UE in the foregoing method design, or may be a chip disposed in the base station or the UE. The communications apparatus includes a processor that is coupled to a memory, and the processor may be configured to execute instructions in the memory, to implement the method performed by the UE in any one of the first aspect or the possible implementations of the first aspect. Optionally, the communications apparatus further includes the memory. Optionally, the communication apparatus further includes a communication interface, and the processor is coupled to the communication interface.

When the communications apparatus is the base station or the UE, the communications interface may be a transceiver or an input/output interface.

When the communications apparatus is the chip disposed in the base station or the UE, the communications interface may be an input/output interface.

Optionally, the transceiver may be a transceiver circuit. Optionally, the input/output interface may be an input/output circuit.

According to a seventh aspect, an embodiment of this application provides a communications system, including a base station and UE. The UE is configured to perform the method provided in any one of the first aspect or the design of the first aspect. The base station is configured to perform the method provided in any one of the second aspect or the design of the second aspect.

According to an eighth aspect, an embodiment of this application provides a chip. The chip is connected to a memory, and is configured to read and execute a software program stored in the memory, to implement the method provided in any one of the first aspect and the second aspect, or the design of the first aspect and the second aspect.

According to a ninth aspect, an embodiment of this application provides a chip. The chip includes a processor and a memory, and the processor is configured to read a software program stored in the memory, to implement the method provided in any one of the first aspect and the second aspect, or the design of the first aspect and the second aspect.

According to a tenth aspect, an embodiment of this application further provides a computer-readable storage medium, configured to store computer software instructions used to perform a function in any one of the first aspect and the second aspect, or the design of the first aspect and the third aspect. The computer-readable storage medium includes a program designed to perform the method in any one of the first aspect and the second aspect, or the design of the first aspect and the second aspect.

According to an eleventh aspect, an embodiment of this application provides a computer program product that includes instructions. When the computer program product is run on a computer, the computer is enabled to perform the method in any one of the first aspect and the second aspect, or the design of the first aspect and the second aspect.

DETAILED DESCRIPTION OF ILLUSTRATIVE EMBODIMENTS

Embodiments of this application may be applied to a communications system, for example, a wireless communications system. A method provided in the embodiments of this application may be used provided that an entity in the communications system needs to indicate a channel occupancy time (COT) format or send COT indication information. Specifically, the communications system includes, but is not limited to a communications system such as a long term evolution (LTE) system, a long term evolution-advanced (LTE-A) system, a new radio (NR) system, and a 5G (5th generation) system, and may also include a system such as a wireless fidelity (Wi-Fi) system and a worldwide interoperability for microwave access (WiMAX) system.

Figure 1:
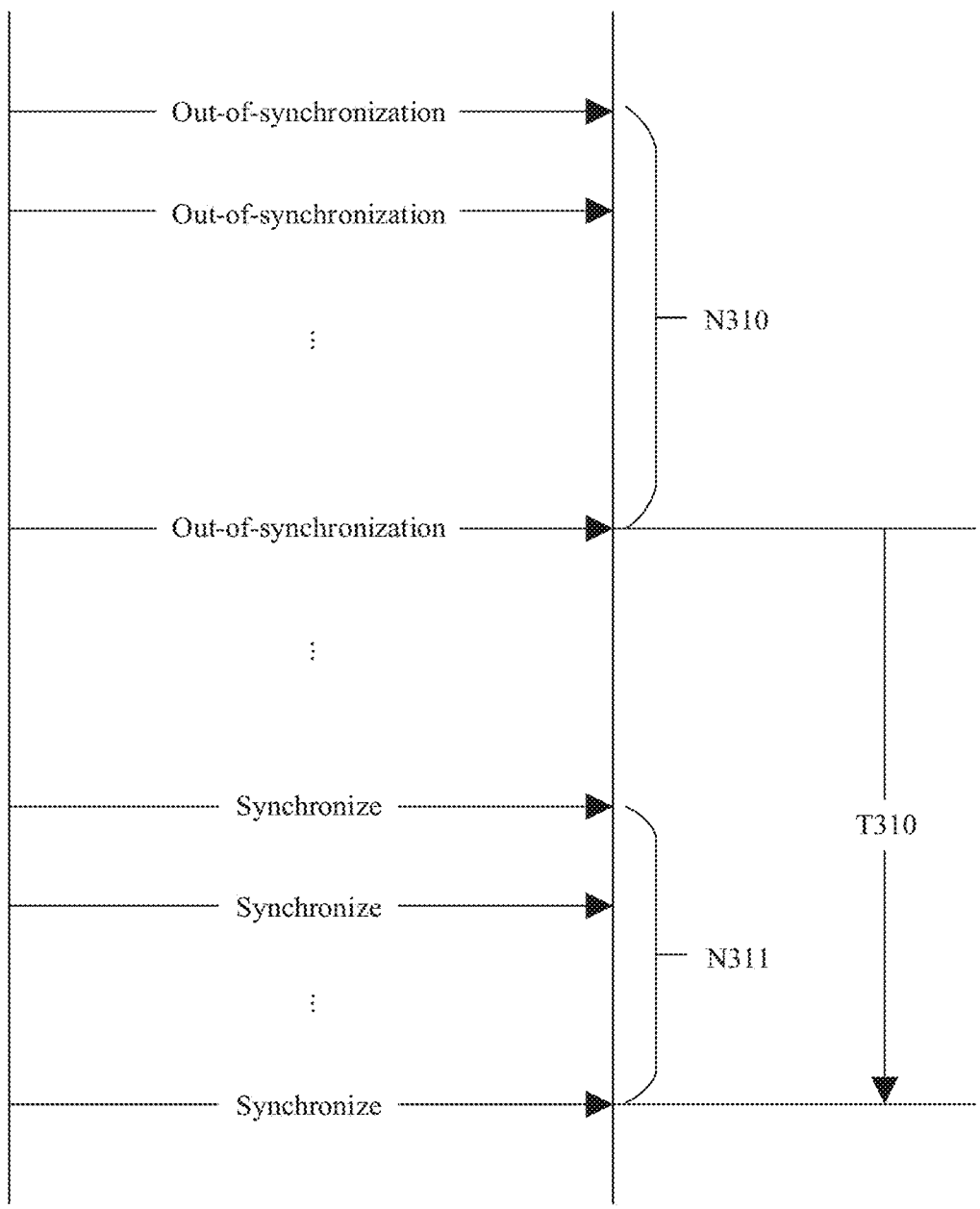
FIG. 1 is a schematic diagram of a radio link monitoring process in an LTE system.
Figure 2:
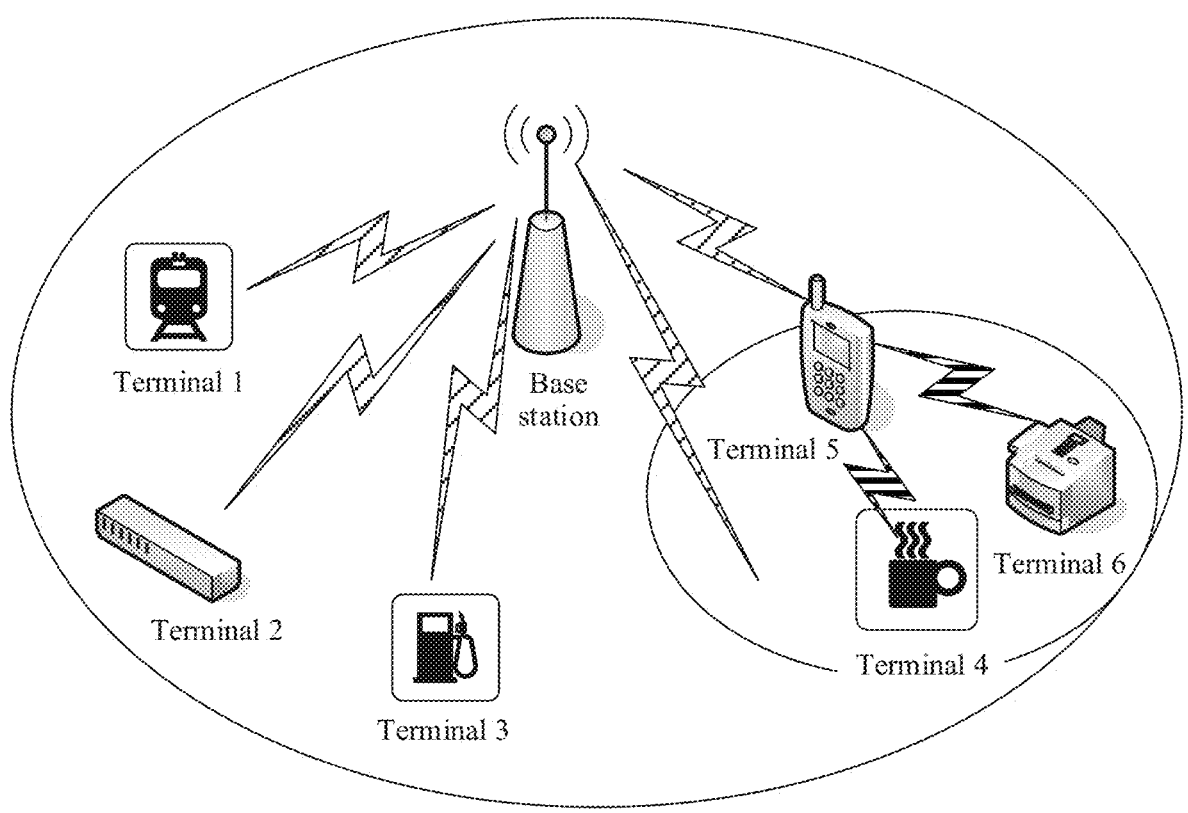
FIG. 2 is a schematic diagram of a communications system.

FIG. 2 is a schematic diagram of a communications system. As shown in FIG. 2, the communications system includes a base station (BS) and terminals 1 to 6. In the communications system, the terminals 1 to 6 may send uplink data to the base station. The base station receives the uplink data sent by the terminals 1 to 6. In addition, the terminals 4 to 6 may also form a sub-communications system. In the communications system, the BS may send downlink data to the terminal 1, the terminal 2, the terminal 5, and the like. The terminal 5 may also send downlink data to the terminal 4 and the terminal 6. The BS may receive the uplink data of the terminal 1, the terminal 2, the terminal 5, and the like. The terminal 5 may also receive the uplink data of the terminal 4 and the terminal 6.

The base station may be a base station (for example, a NodeB or an eNB) in a 2G, a 3G, or an LTE system, a new radio controller (NR controller), a gNodeB (gNB) in a 5G system, a centralized network unit (centralized unit), a new radio base station, a remote radio unit, a micro base station, a distributed network element (distributed unit), a transmission reception point (TRP), a transmission point (TP), or any other radio access device. The embodiments of this application are not limited thereto.

The terminal may be a device that has a function of communicating with the base station and a relay node, or may be a device that provides voice and/or data connectivity for a user. For example, the terminal may be a handheld device or a vehicle-mounted device that has a wireless connection function. A common terminal includes, for example, a mobile phone, a tablet, a notebook computer, a palmtop computer, a mobile Internet device (MID), and a wearable device such as a smartwatch, a smart band, or a pedometer. The terminal may also be referred to as user equipment (UE).

Rapid development of wireless communications technologies leads to an increasing shortage of spectrum resources, and promotes exploration of unlicensed frequency bands. 3GPP introduces a licensed assisted access (LAA) technology and an enhanced licensed assisted access (enhanced LAA, eLAA) technology. In other words, LTE/LTE-A systems are deployed on unlicensed spectra in a non-standalone manner, and usage of unlicensed spectrum resources is maximized with assistance of licensed spectra.

Communications systems deployed on the unlicensed spectra usually use or share radio resources in a contention manner. Generally, before sending a signal, a transmit end first monitors whether an unlicensed channel (or an unlicensed spectrum) is idle. For example, the transmit end determines a busy/idle state of the unlicensed spectrum by monitoring power of a received signal on the unlicensed spectrum. If the power of the received signal is less than a threshold, it is considered that the unlicensed spectrum is in the idle state. The transmit end may send a signal on the unlicensed spectrum. Otherwise, the transmit end does not send a signal. This type of mechanism in which monitoring is performed before sending is referred to as listen before talk (LBT).

Currently, there are mainly two LBT manners: CAT4 LBT (which is also referred to as a type 1 channel access procedure) and CAT2 LBT (which is also referred to as a type 2 channel access procedure). For the CAT2 LBT, a device may access a channel after detecting that the channel is idle for 25 us. For the CAT4 LBT, a device needs to access a channel in a random backoff manner. Specifically, the device selects a corresponding random backoff number based on a channel access priority to perform backoff, and accesses the channel after determining that the channel is idle. The device may obtain a corresponding maximum channel occupancy time (MCOT).

After preempting a channel, a base station may occupy the channel within a time period to perform downlink transmission, and may schedule UE associated with a channel resource to perform uplink transmission. A length of a channel occupancy time (COT) of the base station is related to a priority of performing the LBT by the base station. A lower priority indicates a longer time for which the base station can occupy the channel after preempting the channel is. A maximum channel occupancy time may be 10 ms. The base station may notify the UE of a start time point and/or duration of the COT by using a manner such as a downlink identification signal, request to send/clear to send (RTS/CTS) signaling, or a group common physical downlink control channel (group common PDCCH).

The base station may periodically configure, for the UE, a reference signal (where the reference signal may be referred to as an RLM RS) that is used for radio link monitoring. The reference signal may be a CSI-RS, an SSB, or a discovery reference signal (DRS). In the 5G system, the periodically configured reference signal may fail to be sent because the base station fails to perform the LBT. Due to limitation of the LBT, it cannot be ensured that both a CSI-RS and an SS/PBCH block that are periodically configured by NR-U system are sent on a preset time-frequency resource. This application provides an RLM mechanism used when reference signal sending by the UE is affected by the LBT. An RLM counter/timer (N310/T310) may be semi-statically/dynamically updated by using the method provided in this application. The UE can report an RLM measurement result. The base station may send RLM RS status information.

Figure 3:
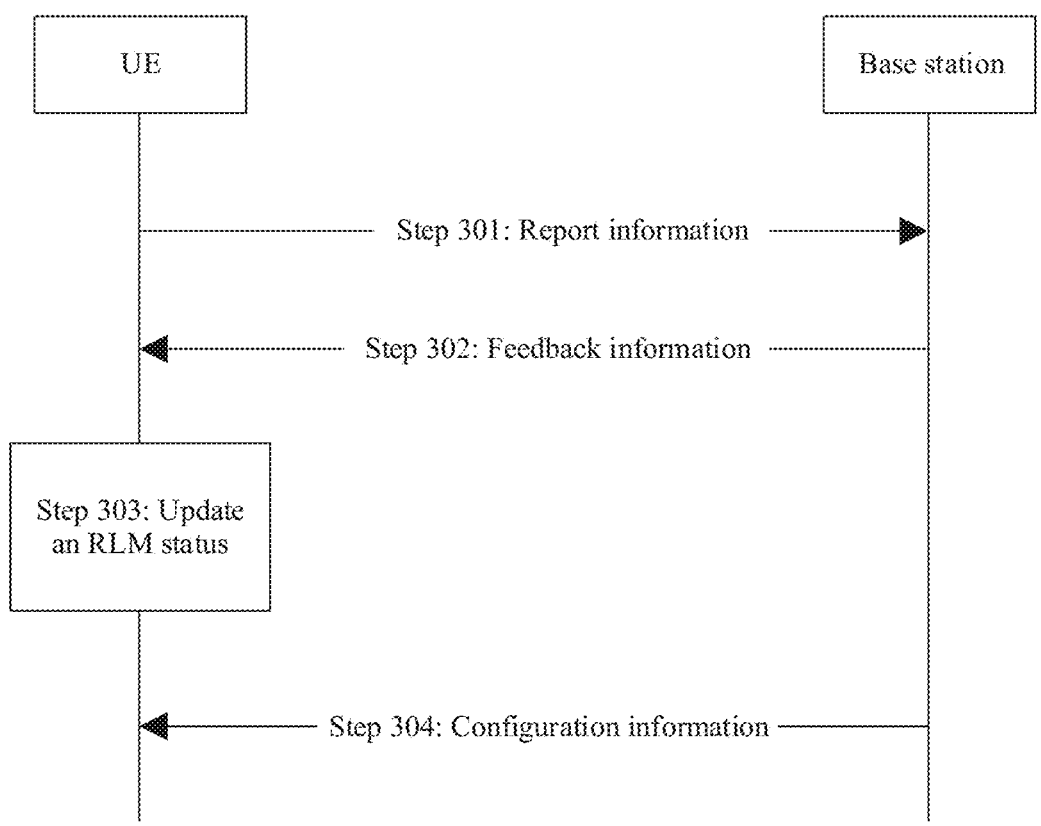
FIG. 3 is a schematic diagram of an RLM method according to this application.

FIG. 3 is a schematic diagram of an RLM method according to this application. As shown in FIG. 3, the method includes the following steps.

Step 301: UE sends report information to a base station, where the report information includes an RLM status of the UE.

The RLM status of the UE includes a detection result of a downlink reference signal or a status of a timer/counter corresponding to a downlink reference signal.

When the UE does not detect the downlink reference signal or energy of a detected reference signal is lower than a threshold, the UE may send the report information to the base station. The report information is used to notify the base station of the detection result of the downlink reference signal. For example, the UE notifies, by using the report information, the base station of a quantity of downlink reference signals that are not correctly detected or downlink reference signals that are not correctly detected.

The UE starts the related timer or counter when the downlink reference signal is not correctly detected. Therefore, the UE may notify, by using the report information, the base station of the status of the timer/counter corresponding to the downlink reference signal. In this way, the base station may also learn that the UE fails to correctly detect one or more downlink reference signals.

The downlink reference signal may be an RLM RS. For example, the downlink reference signal may be a CSI-RS, an SSB, or a DRS.

The report information may be represented in a bitmap form or by using one-bit information. The UE may use a bitmap to notify the base station of the downlink reference signals are not correctly detected. Alternatively, the UE may use the one-bit information to notify the base station that there is an RLM RS that is not correctly received, or notify the base station that T310 has been started.

The report information may further carry a quantity of RLM RSs that are not correctly received.

Before the report information is sent, the base station may configure an uplink resource for the UE. The UE sends the report information on the configured uplink resource.

Step 302: The UE receives feedback information from the base station, where the feedback information includes sending status information of the one or more downlink reference signals.

The base station notifies, by using the feedback information, the UE of downlink reference signals that are not sent because LBT fails. The base station may feed back sending statuses of N310 downlink reference signals. If the base station always feeds back sending statuses of downlink reference signals in a monitoring window whose length includes the N310 downlink reference signals, the UE may notify, by using one bit, the base station that at least one reference signal is not correctly received.

The feedback information may also be represented by using a bitmap.

By using the method provided in this embodiment of this application, the UE can learn of a more accurate RLM result, and unnecessary reconnection is avoided, so that power consumption of the UE is reduced and system resource overheads are reduced.

(Optional) Step 303: The UE updates the RLM status.

Optionally, the UE updates the timer/counter corresponding to the downlink reference signal. For example, the UE resets or updates N310, T310, or N311. Optionally, resetting the timer or the counter means clearing the timer or the counter.

The UE may perform more accurate timing/counting, and perform communication based on a timing/counting result. In other words, the UE may utilize the more accurate RLM result, to avoid the unnecessary reconnection.

(Optional) Step 304: The UE receives configuration information from the base station. The configuration information carries information used to update an RLM timer/counter. The RLM timer/counter may be N310/T310. The configuration information may be a parameter. The UE may adjust a value of the RLM timer/counter by using the parameter.

It should be understood that step 304 may exist independently of steps 301 to 303. In other words, the base station and the UE may independently perform step 304. In addition, step 304 may be performed before steps 301 to 303 or between steps 301 and 303. This is not limited in this application. Different services have different delay requirements. Therefore, for timer/counter parameters may be configured for the UE based on different services, and the UE may perform more accurate timing/counting in different service scenarios. In addition, reference signals configured for UEs in different groups are affected by the LBT to different degrees. Therefore, RLM parameters of the UEs in the different groups should also be differently configured, to compensate the different reference signals to different degrees.

Embodiment 1

Figure 4A:
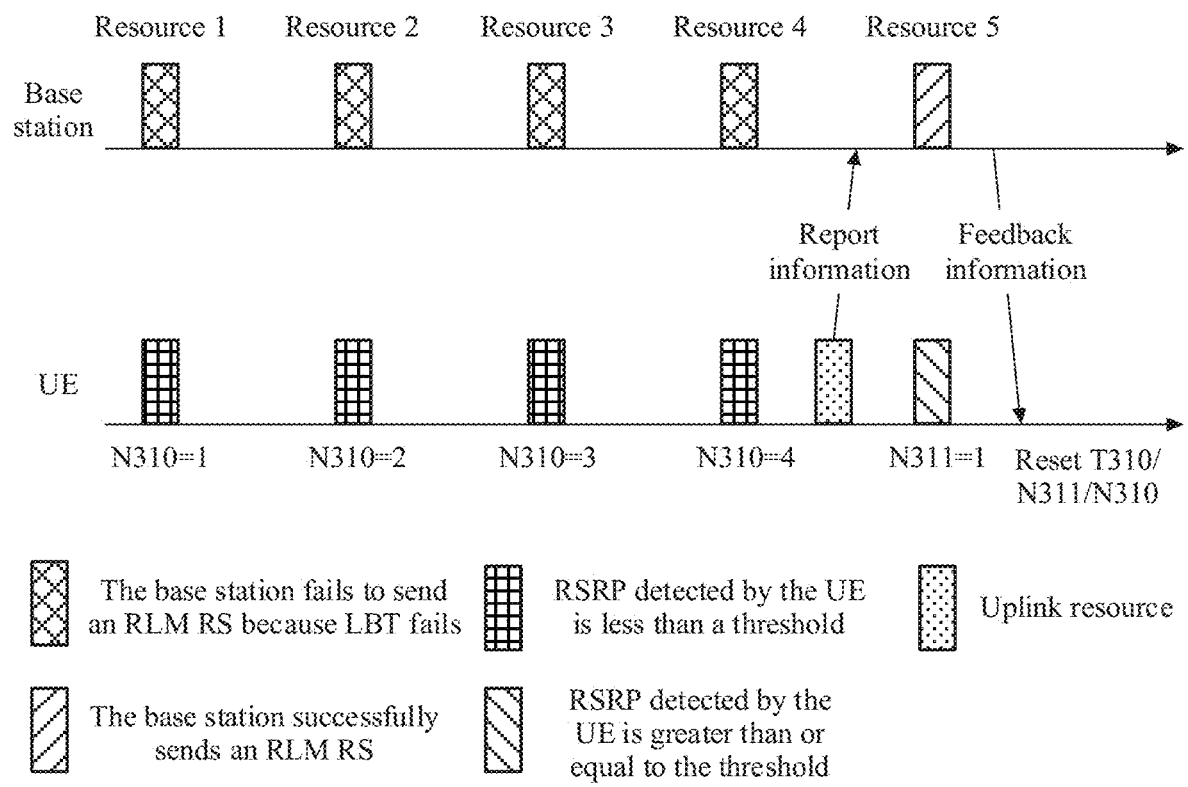
FIG. 4a to FIG. 4f are schematic diagrams of an RLM process according to an embodiment of this application.

A base station periodically configures, for UE, a reference signal that is used for radio link monitoring. In a 5G system, the periodically configured reference signal may fail to be sent because the base station fails to perform LBT. FIG. 4a to FIG. 4f are schematic diagrams of an RLM process according to this application. As shown in FIG. 4a, because LBT fails, a base station fails to send a reference signal on a resource 1, a resource 2, a resource 3, and a resource 4.

A preset threshold of N310 configured by the base station for UE is 4 (certainly, the preset threshold may be any positive integer, and an initial value of N310 is 0), and a configured sending periodicity of the RLM RS is 20 ms. Therefore, duration (or a monitoring window) corresponding to N310 is 80 ms. The UE monitors, every 20 ms, RSRP of a resource used to transmit the RLM RS. When the RSRP (or a PDCCH demodulation probability corresponding to the RSRP) is lower than a threshold, the timer N310 is immediately started. When energy of a reference signal monitored by the UE at a resource location is lower than the threshold, a value of N310 is incremented by one. When energy of reference signals monitored by the UE at four consecutive resource locations is less than the threshold, the UE starts a timer T310. In other words, when the value of N310 reaches the preset threshold (for example, 4), T310 is started.

The UE may report an RLM detection result (or receiving statuses of the plurality of previous RLM RSs) to the base station. For example, when the UE does not receive the RLM RS on four consecutive resources, the UE reports the result to the base station. Optionally, the UE may report the result in a bitmap form. For example, the UE notifies, by using a bitmap of "0000", the base station that none of the four RLM RSs are correctly received. Alternatively, the UE notifies the base station of a quantity of RLM RSs that are not received (or not correctly received or not detected) within the monitoring window (for example, 80 ms) corresponding to N310 or within duration including the monitoring window (for example, in FIG. 4a, report information of the UE carries that a quantity of RLM RSs that are detected on the resources 1 to 4 by the UE and whose RSRP is less than the threshold is four). The UE may report the RLM detection result to the base station at any time point after N310 or T310 is started.

After receiving the result reported by the UE, the base station may feed back, to the UE, a sending status of the RLM RS of the base station. The base station may also feed back, to the UE in a bitmap form, the sending status of the RLM RS of the base station. For example, '0100' indicates that only a second RLM RS in the four RLM RSs is successfully sent, and the remaining three RLM RSs are not sent because the LBT fails. Alternatively, '1' is sent to the UE to indicate that only one RLM RS is successfully sent. For example, feedback information in FIG. 4a carries a quantity 1 or carries '0000'.

Optionally, the base station may feed back, to the UE, a sending status of one or more RLM RSs before the base station sends the feedback information, or the base station may feed back, to the UE, a sending status of one or more RLM RSs before the base station receives the report information from the UE. For example, the feedback information in FIG. 4a carries '0000' or '00001'.

After receiving the information fed back by the base station, the UE learns that the one or more RLM RSs are not correctly sent because the base station fails to perform LBT, instead of not correctly received due to poor link quality. In this case, the UE may reset or update the counter and/or the timer based on the information.

For example, when RSRP of a first RLM RS monitored by the UE is lower than the threshold, the UE starts a counter N310 (in this case, the counter N310=1). For example, N310 of the UE is 1 on the resource 1 in FIG. 4a. When the RSRP of the subsequent three consecutive RLM RSs is all lower than the threshold, the counter N310=4, which reaches the preset threshold of the counter N310. In this case, the UE starts the timer T310 and a counter N311, and sends the report information on an uplink resource configured by the base station for the UE. Before receiving the feedback from the base station, the UE continues the RLM process. In other words, T310/N311 does not pause. For example, N311 is 1 on a resource 5 in FIG. 4a. When receiving the feedback information (the sending status, fed back by the base station, of the RLM RS) from the base station, the UE resets or updates N310 and/or N311 and/or T310.

Figure 4B:
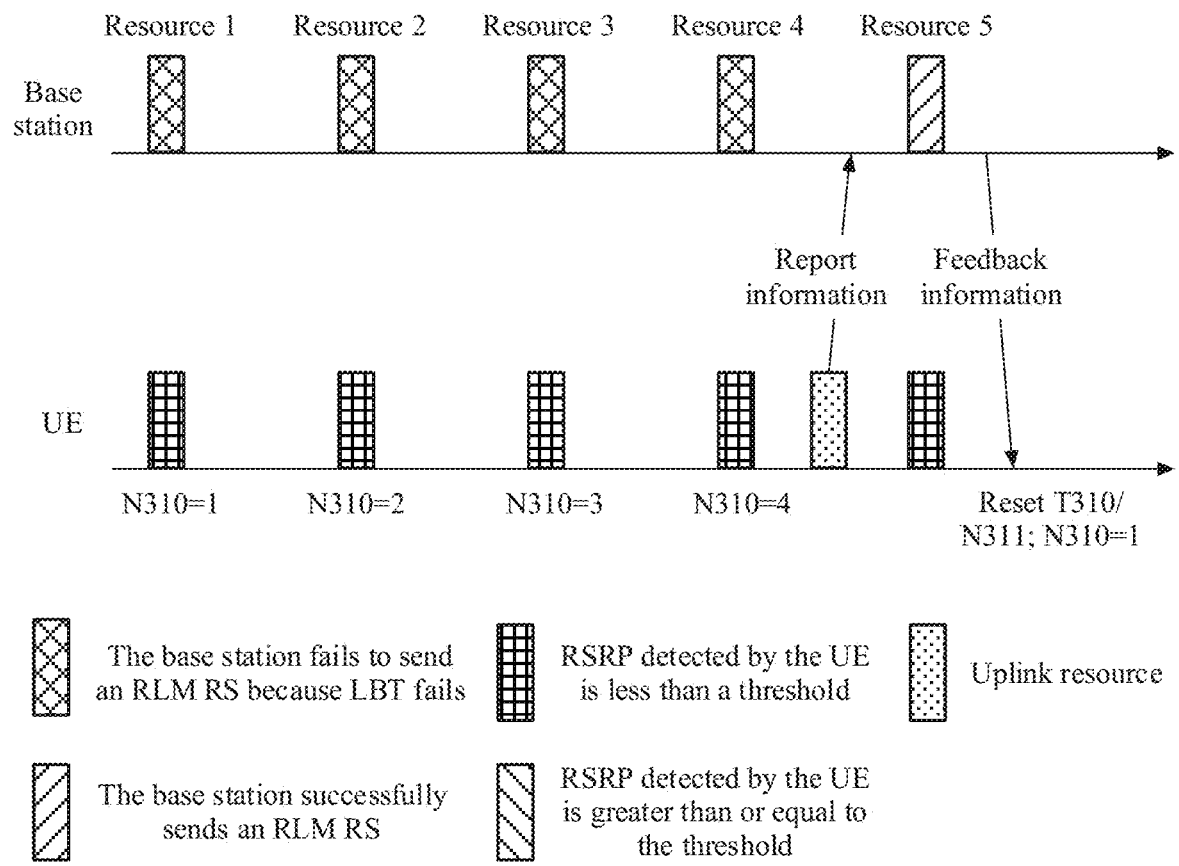

As shown in FIG. 4a, the base station notifies the UE that the RLM RSs are not sent on the resource 1, the resource 2, the resource 3, and the resource 4 because the LBT fails. If the UE does not receive the RLM RS because the RLM RS is not sent due to an LBT failure, N310 should not be started or should not be incremented. Therefore, T310 should not be started either. Therefore, when receiving the feedback information from the base station, the UE resets T310 and/or N311. Further, when RSRP of an RLM RS detected by the UE before the UE receives the feedback information from the base station is less than the threshold, the UE starts N310. Otherwise, the UE does not start N310. For example, in FIG. 4a, when RSRP of an RLM RS detected on the resource 5 by the UE is greater than or equal to the threshold, the UE resets T310 and N311, and does not start N310. In FIG. 4b, when the RSRP of the RLM RS detected on the resource 5 by the UE is less than the threshold, the UE resets T310 and N311, and starts N310.

Figure 4C:
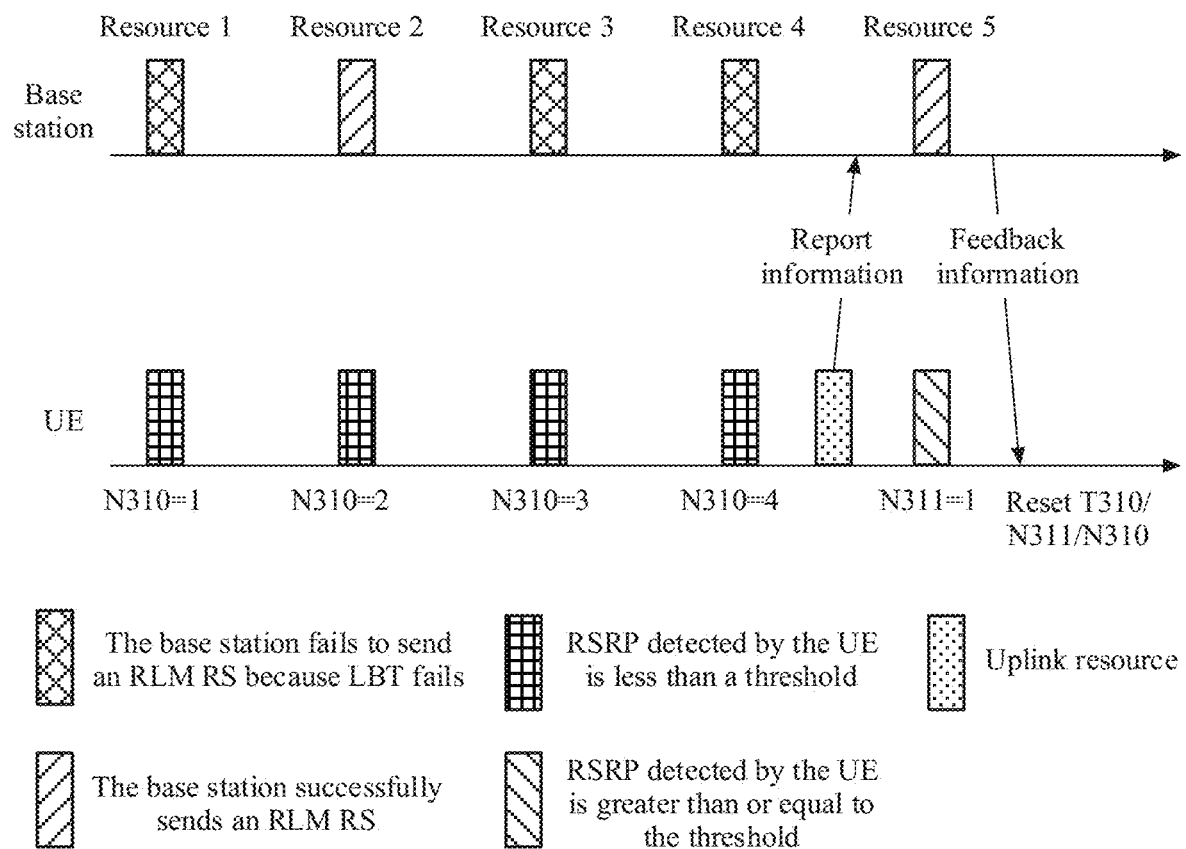

As shown in FIG. 4c, the base station notifies, by using the feedback information, the UE that the base station does not send the RLM RS on the resource 1, the resource 3, and the resource 4 because the LBT fails. Because the UE successfully detects the RLM RS on the resource 5, N311 of the UE is 1 on the resource 5. After receiving the feedback information, the UE resets T310, N311, and N310. In this case, a link between the UE and the base station may be considered normal.

Figure 4D:
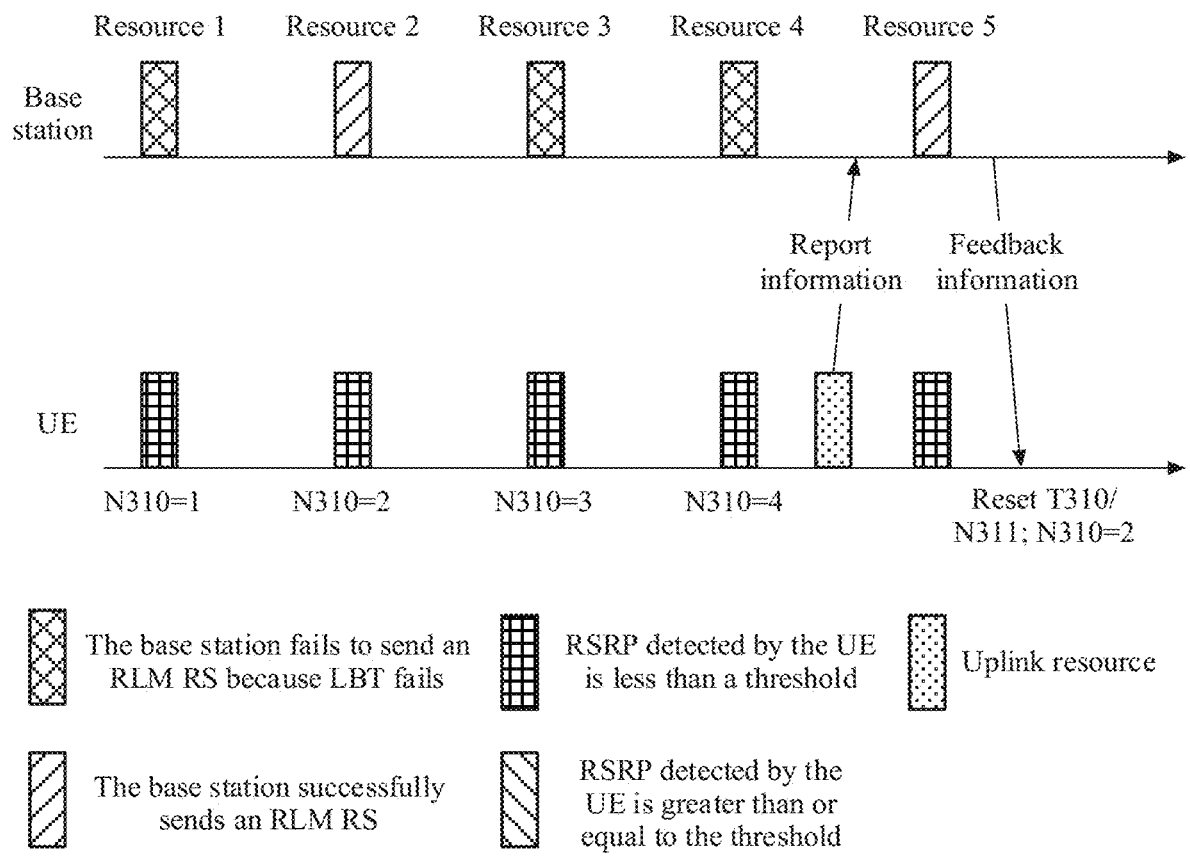

As shown in FIG. 4d, the base station notifies, by using the feedback information, the UE that the base station does not send the RLM RS on the resource 1, the resource 3, and the resource 4 because the LBT fails. Because the UE fails to successfully detect the RLM RS on the resource 5, the UE resets T310 and N311 after receiving the feedback information, and updates N310 to 2. In this case, it may be considered that N310 of the UE is recounted from 2. The UE may repeat the foregoing steps subsequently, and details are not described herein again.

Further, the resource used to send the report information and a time-frequency resource used to transmit the RLM RS may be in a one-to-one correspondence, or may not be in a one-to-one correspondence. When the resource and the time-frequency resource are in the one-to-one correspondence, each RLM RS has a corresponding uplink resource used by the UE to send the report information. In time, the uplink resource is earlier than a preset sending time point of a next RLM RS. When the resource and the time-frequency resource are not in the one-to-one correspondence, the UE may not send the report information when N310 expires or when T310 is started. The UE continues to perform radio link monitoring based on an RLM mechanism, and sends, when starting N310 and/or N311 and/or T310, the report information by using one or more pre-configured uplink resources. The base station may pre-configure the uplink resource for the UE in a static manner (indicating the uplink resource by using RMSI/OSI/RRC signaling), a semi-static manner (indicating the uplink resource by using RMSI/OSI/RRC signaling), or a dynamic manner (by using DCI). The uplink resource may be dedicated to sending the report information (for example, the uplink resource may be a PRACH), or may be used to carry other information except the report information (for example, the uplink resource may be a PUCCH).

Figure 4E:
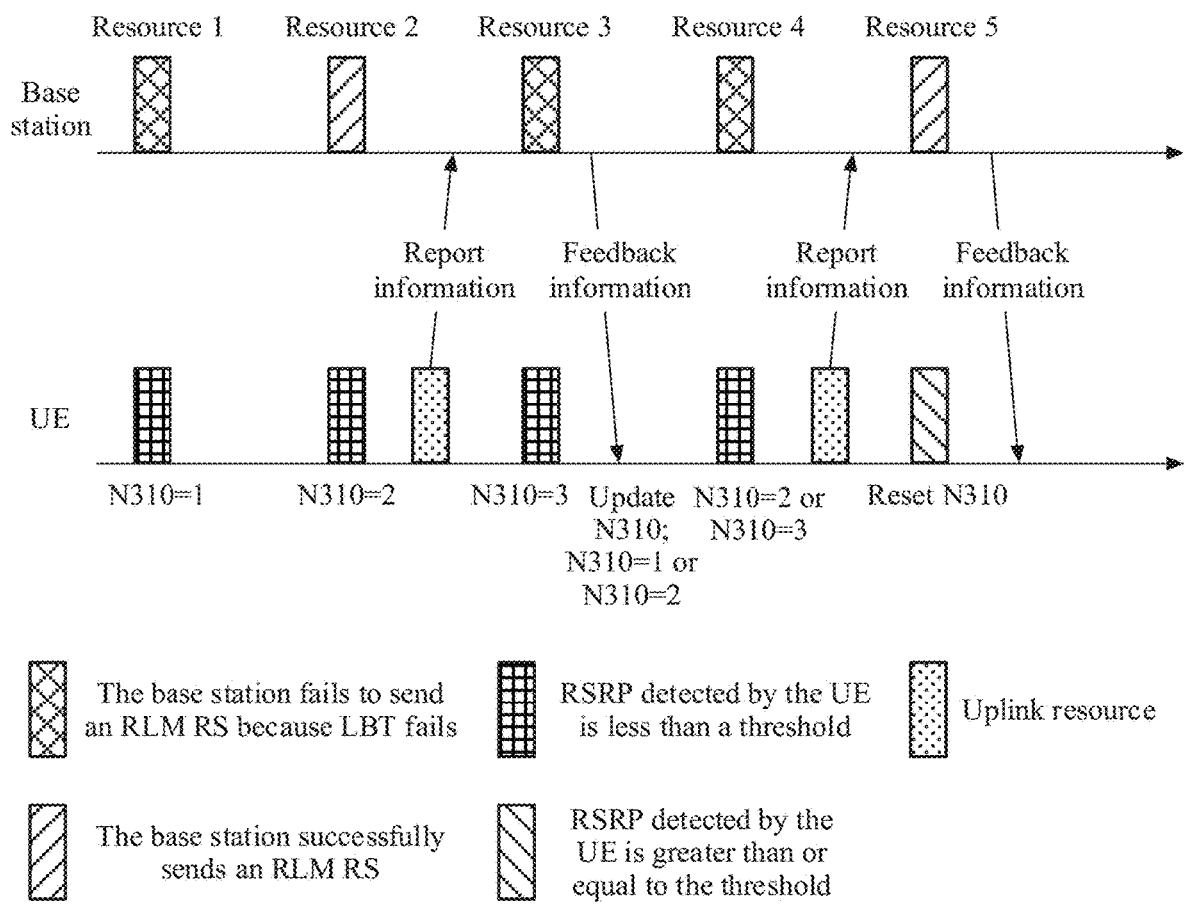

As shown in FIG. 4e, an uplink resource that is used by the UE to send the report information is configured after every two detection locations of the RLM RSs. When receiving the feedback information after the resource 3, the UE updates N310. When the feedback information carries sending status information of the RLM RSs on the resources 1 to 3, the UE learns that there are two RLM RSs that fail to be sent by the base station because the LBT fails. The UE updates the value of N310 to 1. When the feedback information carries sending status information of the RLM RSs on the resource 1 and the resource 2, the UE learns that there is one RLM RS that fails to be sent by the base station because the LBT fails. The UE updates the value of N310 to 2.

Figure 4F:
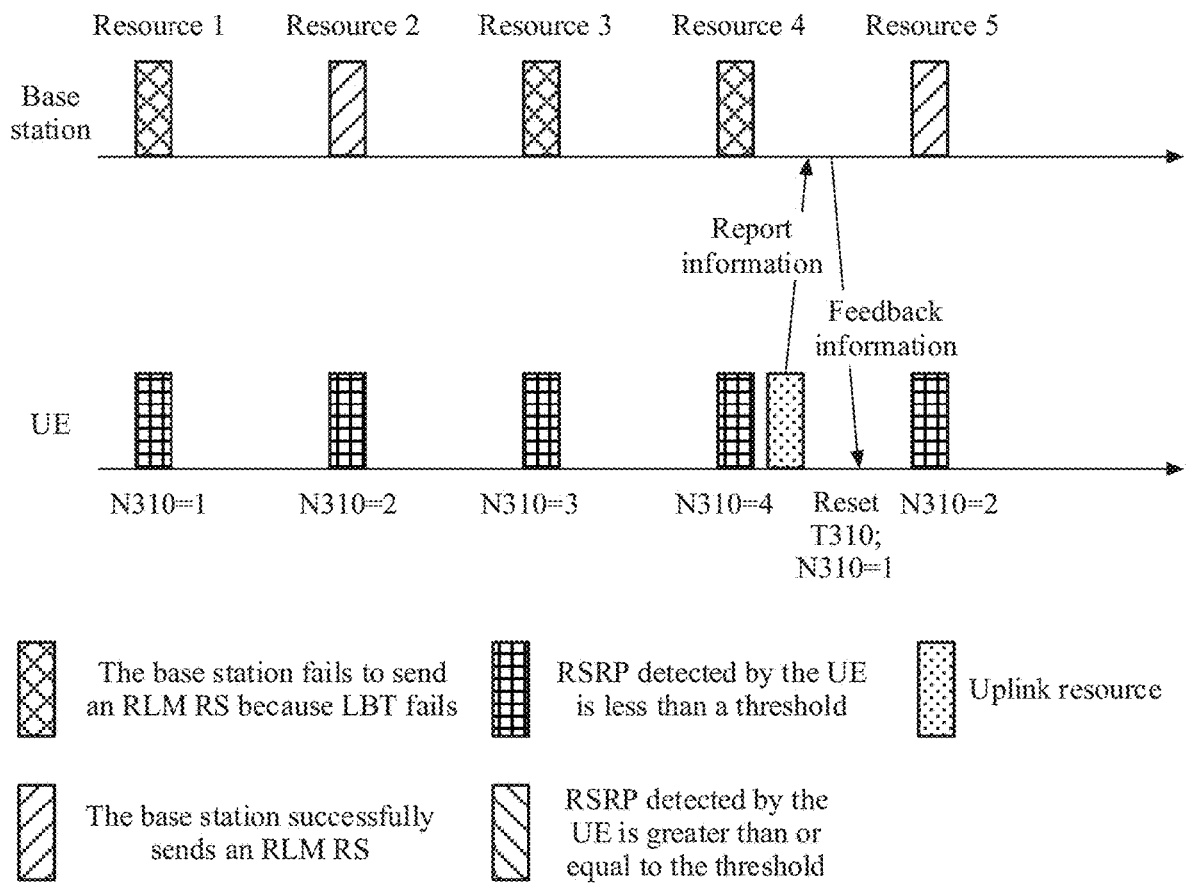

As shown in FIG. 4f, the UE does not detect the RLM RS between a time point of sending the report information and a time point of receiving the feedback information. After receiving the feedback information, the UE resets T310, and updates N310. When the feedback information carries sending status information of the RLM RSs on the resource 1, the resource 3, and the resource 4, the UE learns that there are three RLM RSs that fail to be sent by the base station because the LBT fails. The UE updates the value of N310 to 1. The value of N310 of the UE on the resource 5 is 2.

Optionally, the UE may notify the base station of an RLM status of the UE by using only one-bit report information. For example, the base station is notified that a current RLM status of the UE is that the UE has started T310. The base station may notify the UE of the sending statuses of the plurality of previous RLM RSs by using downlink control information (DCI) or radio resource control (RRC) signaling. In this case, a quantity of the plurality of RLM RSs may be specified in a standard, or may change dynamically. When RLM RS monitoring quantities and/or periodicities configured for different UEs are different, the base station may notify sending statuses of RLM RSs of corresponding quantities to different UEs.

Further, the UE may use information that is greater than one bit and that is in the report information, to notify the base station of the RLM result of the UE and a quantity of RLM RS sending statuses requested to be fed back by the base station. The base station sends, to the UE based on the received report information, the sending statuses of the plurality of previous RLM RSs.

Optionally, the quantity of the RLM RS sending statuses delivered by the base station is consistent with a quantity of RLM RSs configured by the UE in a monitoring window corresponding to N310 or N311.

Figure 5:
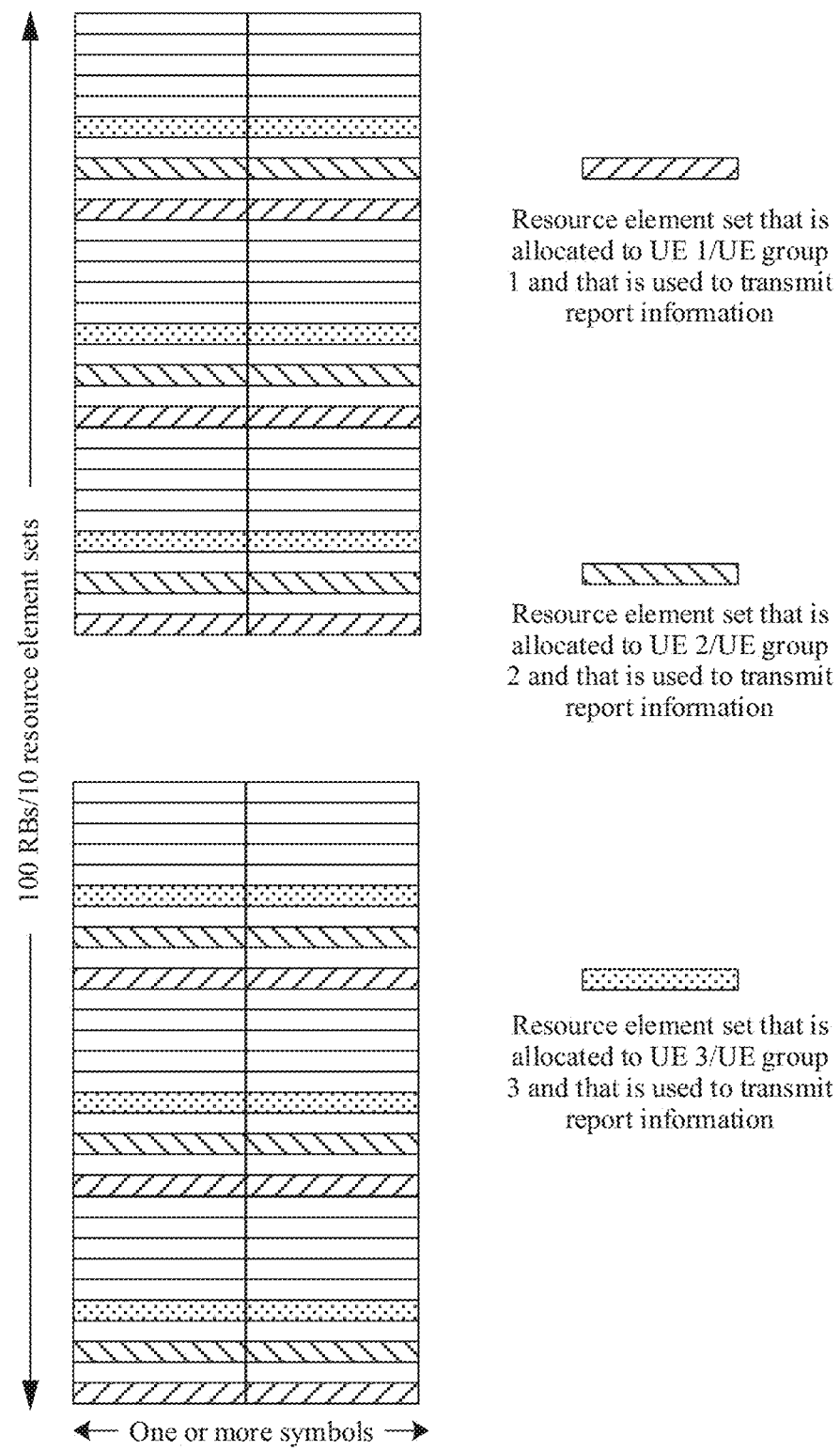
FIG. 5 is a schematic diagram of allocating a resource used to transmit report information.

The UE may send the report information to the base station by using an uplink channel such as a physical uplink control channel (PUCCH), a scheduling request (SR), or a physical random access channel (PRACH). Alternatively, the report information may be transmitted by using the uplink resource periodically configured by the base station for the UE. Alternatively, the report information may be sent by using an authorized resource. A plurality of UEs may perform reporting in an orthogonal manner. FIG. 5 is a schematic diagram of allocating a resource used to transmit report information. As shown in FIG. 5, different UEs may be configured to simultaneously send respective report information in different resource element sets (interlace) and/or different signals in RACH resources. The resource element set may be in a unit of a resource block (RB), or may be in a unit of a sub-RB. A base station may determine, based on a time-frequency position at which the report information is received and additional orthogonal code (for example, orthogonal preamble code, to further increase a maximum quantity of UEs that support simultaneous sending of the report information), UE from which the report information is received.

An RLM RS sending status fed back by the base station may be carried in a common message. For example, the RLM RS sending status may be carried in remaining minimum system information (RMSI) or a group common PDCCH.

After sending the report information to the base station, the UE may continuously monitor, within a preset time window, a feedback that may be sent by the base station. A length of the time window may be specified in a standard, or may be configured by the base station and notified to the UE by using signaling such as RMSI signaling or RRC signaling. If the UE does not receive the feedback from the base station within the specified time window, the UE performs RLM according to the previous process, for example, does not update a timer N310/T310.

Further, when the UE does not receive the feedback from the base station or does not detect that N311 consecutive RLM RSs are greater than a threshold before T310 expires, the UE considers that a previous radio link fails. In this case, the UE receives a system message (for example, RMSI) from the base station, and initiates random access on a specified uplink resource, to attempt to establish a connection to the base station again. The foregoing method may also be used by the UE to exchange information with the base station when the timer T310 is about to expire and the UE needs to be reconnected to the base station. For example, before T310 expires, when the UE still does not receive a feedback from the base station or does not detect that energy of N311 consecutive RLM RSs is greater than a preset threshold, the UE considers that a radio link between the UE and the base station fails. The UE receives a system message from the base station, and initiates random access on a specified uplink resource, to attempt to establish a connection to the base station again.

Embodiment 1 provides an interaction mechanism between the UE and the base station, to reduce impact of the LBT on the RLM mechanism, so that the UE performs RLM more accurately.

Embodiment 2

In a 5G system, a base station may flexibly perform parameter configuration on N310 based on a parameter such as a data type. For example, N310 is periodically configured by using RMSI, or is dynamically or semi-statically configured by using RRC. The base station may determine how to configure N310. For example, the base station may perform configuration after N RLM RSs are unsuccessfully sent, or may update configuration periodically (for example, 1 s).

For an eMBB service, an RLM RS periodicity may be 10 ms, and duration of N310 may be 100 ms.

For a voice service, an RLM RS periodicity may be 10 ms, and duration of N310 may be 50 ms.

In an unauthorized communication scenario, sending of the RLM RS is affected by LBT, and the LBT depends on ambient interference and changes with time. Therefore, the base station may configure, for UE, an additional parameter in the RMSI/RRC, to indicate an updated N310/T310 parameter to the UE. A value of the additional parameter may be determined by the base station, and is not specified in a standard. It should be noted that the base station may configure different parameters for different UEs/UEs in different groups.

For a scenario in which the different UEs work on different frequency bands or different bandwidth parts (BWP), the frequency band and the BWP suffer different external interference. As a result, probabilities of successfully sending RLM RSs configured for the different UEs are different. To prevent frequent reconnection attempts performed by the UE due to an RLM failure, different RLM parameters need to be configured for the different UEs. For example:

If the addition parameter indicated by the base station to the UE is 0.8, for an eMBB service, duration of a counter N310 of the UE is 100/0.8=125 ms. Alternatively, the base station may indicate that additional duration of a timer N310 is 25 ms, so that updated duration of the timer N310 is 100+25=125 ms.

Similarly, the base station may also use the same method to update/modify T310 or another RLM RS-related timer. Details are not described herein again.

When a same additional parameter is configured for all UEs, the base station may carry the additional parameter in RMSI, OSI, or a group common PDCCH. When additional parameters configured for all UEs are different, the base station may separately configure an additional parameter for each group of UEs/each UE by using RRC signaling, or may indicate an additional parameter by scheduling DCI corresponding to each UE/each group of UEs, or may indicate an additional parameter on a group common PDCCH. The group common PDCCH may include a plurality of information elements, and each information element includes a UE/UE group identifier (for example, a C-RNTI of UE or an RNTI of a UE group) and a corresponding additional parameter. The foregoing additional parameter may alternatively be an offset that is based on an original timer.

Embodiment 2 provides a method in which the base station updates an RLM-related timer/counter on a UE side by using the additional parameter, so that the timer/counter of the UE is more flexible and better adapts to an environment change.

By using the method provided in this embodiment of this application, the RLM counter (N310/N311) may be semi-statically or dynamically updated. Considering impact of the LBT on sending of the RLM RS, an RLM-RS measurement window is set more properly. Further, the UE feeds back an RLM measurement result and the base station sends an RLM RS status indication, so that RLM RS measurement is more accurate.

In this embodiment of this application, the method in which the UE determines a radio link status by using the RLM RS may also be used by the UE to perform radio resource management (RRM) measurement. The base station configures, by using the method described in this embodiment, an RRM-RS used for RRM measurement, and the UE performs reporting based on the RRM-RS configured by the base station and a measurement result of the UE.

The foregoing describes in detail the transmission method according to the embodiments of this application with reference to FIG. 1 to FIG. 5. Based on a same inventive concept, the following describes a transmission apparatus according to the embodiments of this application with reference to FIG. 6 to FIG. 8. It should be understood that the technical features described in the method embodiments are also applicable to the following apparatus embodiments.

Figure 6:
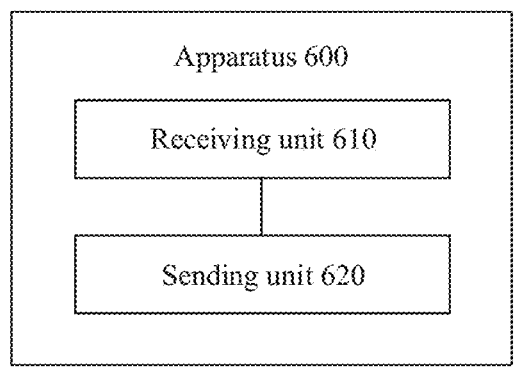
FIG. 6 is a schematic diagram of a control information transmission apparatus 600 according to an embodiment of this application.

FIG. 6 is a schematic block diagram of a control information transmission apparatus 600 according to an embodiment of this application. The apparatus 600 is configured to perform the method performed by the base station in the foregoing method embodiments. Optionally, a specific form of the apparatus 600 may be the base station or a chip in the base station. This is not limited in this embodiment of this application. The apparatus 600 includes the following modules:

a receiving module 610, configured to receive report information from user equipment UE, where the report information includes a detection result of one or more downlink reference signals of the UE or a status of a timer/counter corresponding to the one or more downlink reference signals; and a sending module 620, configured to send feedback information to the UE, where the feedback information includes sending status information of the one or more downlink reference signals.

In a possible design, when the UE does not detect the at least one downlink reference signal or energy of at least one detected downlink reference signal is lower than a threshold, the receiving module 610 receives the report information from the UE.

In a possible design, the report information may be represented in a bitmap form or by using one-bit information.

In a possible design, the one-bit information is used to indicate whether the UE includes a downlink reference signal that is not correctly received, or is used to indicate whether the timer/counter corresponding to the one or more downlink reference signals is started.

In a possible design, the sending status information of the one or more downlink reference signals includes that at least one of the one or more downlink reference signals is not sent because LBT fails.

In a possible design, the sending module 620 is further configured to send configuration information to the UE. The configuration information carries a parameter used to update the timer/counter corresponding to the one or more downlink reference signals.

Further, the apparatus 600 may further include a processing module. The processing module is configured to process received data and to-be-sent data.

Figure 7:
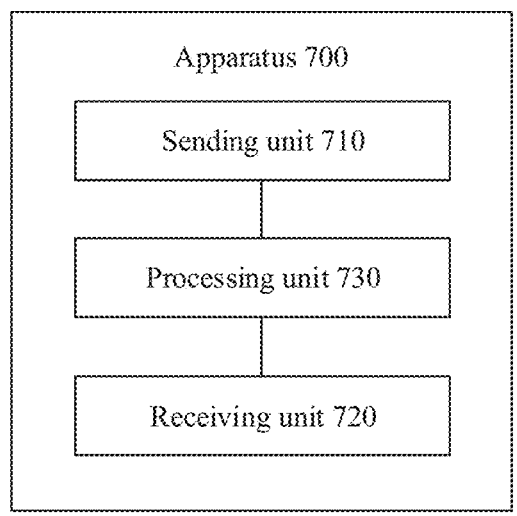
FIG. 7 is a schematic diagram of a control information transmission apparatus 700 according to an embodiment of this application.

FIG. 7 is a schematic block diagram of a control information transmission apparatus 700 according to an embodiment of this application. The apparatus 700 is configured to perform the method performed by the second device in the foregoing method embodiments. Optionally, a specific form of the apparatus 700 may be the UE or a chip in the UE. This is not limited in this embodiment of this application. The apparatus 700 includes the following modules:

a sending module 710, configured to send report information to a base station, where the report information includes a detection result of one or more downlink reference signals of UE or a status of a timer/counter corresponding to the one or more downlink reference signals; and a receiving module 720, configured to receive feedback information from the base station, where the feedback information includes sending status information of the one or more downlink reference signals.

In a possible design, when the UE does not detect the at least one downlink reference signal or energy of at least one detected downlink reference signal is lower than a threshold, the sending module 710 sends the report information to the base station.

In a possible design, the report information may be represented in a bitmap form or by using one-bit information.

In a possible design, the one-bit information is used to indicate whether the UE includes a downlink reference signal that is not correctly received, or is used to indicate whether the timer/counter corresponding to the one or more downlink reference signals is started.

In a possible design, the sending status information of the one or more downlink reference signals includes that at least one of the one or more downlink reference signals is not sent because LBT fails.

In a possible design, the apparatus 700 further includes: a processing module 730, configured to update the timer/counter corresponding to the one or more downlink reference signals.

In a possible design, the receiving module 720 is further configured to receive configuration information from the base station. The configuration information carries a parameter used to update the timer/counter corresponding to the one or more downlink reference signals.

Further, the processing module 730 is further configured to process received data and to-be-sent data, and the sending module is configured to send data.

Figure 8:
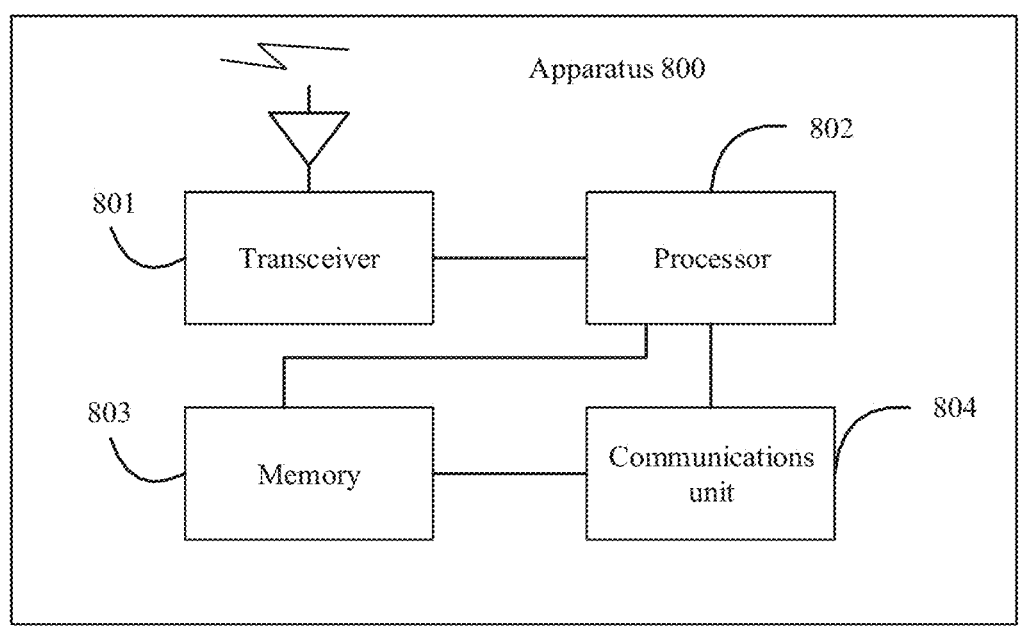
FIG. 8 is a schematic diagram of a communications apparatus 800 according to an embodiment of this application.

Based on a same inventive concept, an embodiment of this application further provides a communications apparatus 800. FIG. 8 is a possible schematic structural diagram of the base station or the UE in the foregoing method embodiments. The apparatus 800 may include a transceiver 801. The transceiver 801 may further include a receiver and a transmitter.

The transceiver 801 is configured to send or receive report information. The transceiver 801 may further be configured to receive or send feedback information. The report information includes a detection result of one or more downlink reference signals of the UE or a status of a timer/counter corresponding to the one or more downlink reference signals. The feedback information includes sending status information of the one or more downlink reference signals.

It should be understood that, in some embodiments, the transceiver 801 may be integrated by the transmitter and the receiver. In another embodiment, the transmitter and the receiver may alternatively be independent of each other.

Further, the apparatus 800 may further include a processor 802, a memory 803, and a communications unit 804. The transceiver 801, the processor 802, the memory 803, and the communications unit 804 are connected by using a bus.

On a downlink, to-be-sent data (for example, data carried on a PDSCH) or to-be-sent signaling (for example, signaling on a PDCCH) is adjusted by the transceiver 801 to output a sample and generate a downlink signal. The downlink signal is transmitted to the terminal in the foregoing embodiments by using an antenna. On an uplink, the antenna receives the uplink signal sent by the terminal in the foregoing embodiments. The transceiver 801 adjusts the signal received by using the antenna, and provides an input sample. In the processor 802, service data and a signaling message are processed, for example, to-be-sent data is modulated and an SC-FDMA symbol is generated. These units perform processing based on a radio access technology (for example, an access technology in an LTE system, a 5G system, or another evolved system) used by a radio access network.

The processor 802 is further configured to control and manage the apparatus 800, to perform processing performed by the base station or the UE in the foregoing method embodiments. Specifically, the processor 802 is configured to process received information and to-be-sent information. For example, the processor 802 is configured to support the apparatus 800 in performing the processing process of the UE in FIG. 2 to FIG. 5. When the apparatus 800 is used in an unlicensed scenario, the processor 802 further needs to control the apparatus 800 to perform channel listening, to transmit data or signaling. For example, the processor 802 performs channel listening by using a signal that is received by the transceiver 801 and that is received from a transceiver apparatus or the antenna, and controls the signal to send the signal by using the antenna, to preempt the channel. In different embodiments, the processor 802 may include one or more processors, for example, include one or more central processing units (CPU). The processor 802 may be integrated into a chip, or may be a chip.

The memory 803 is configured to store related instructions and data, and program code and data that are of the apparatus 800. In different embodiments, the memory 803 includes but is not limited to a random access memory (RAM), a read-only memory (ROM), an erasable programmable read-only memory (Erasable Programmable Read Only Memory, EPROM), or a portable read-only memory. In this embodiment, the memory 803 is independent of the processor 802. In another embodiment, the memory 803 may alternatively be integrated into the processor 802.

It should be noted that the apparatus 800 shown in FIG. 8 may be configured to perform the method performed by the base station or the UE in the foregoing method embodiments. For implementations and technical effects that are not described in detail in the apparatus 800 shown in FIG. 8, refer to the related descriptions in the foregoing method embodiments.

It may be understood that FIG. 8 shows only a simplified design of the base station or the UE. In different embodiments, the base station or the UE may include any quantity of transmitters, receivers, processors, memories, and the like, and all base stations or UEs that can implement this application fall within the protection scope of this application.

An embodiment of this application provides a communications system. The communications system includes a base station or UE. The base station may be the communications apparatus shown in FIG. 6 or the apparatus shown in FIG. 8. The UE may be the communications apparatus shown in FIG. 7 or the apparatus shown in FIG. 8.

Based on a same inventive concept, an embodiment of this application further provides a computer program product. The computer program product includes computer program code. When the computer program code is run on a computer, the computer is enabled to perform the methods in the embodiments shown in FIG. 2 to FIG. 5.

Based on a same inventive concept, an embodiment of this application further provides a computer-readable medium. The computer-readable medium stores program code. When the program code is run on a computer, the computer is enabled to perform the methods in the embodiments shown in FIG. 2 to FIG. 5.

Based on a same inventive concept, an embodiment of this application further provides a chip. The chip may be a processor, configured to implement the methods in the foregoing method embodiments. Further, the chip is connected to a memory, and is configured to read and execute a software program stored in the memory, to implement the methods in the embodiments shown in FIG. 2 to FIG. 5.

Based on a same inventive concept, an embodiment of this application provides a chip. The chip includes a processor and a memory, and the processor is configured to read a software program stored in the memory, to implement the methods in the embodiments shown in FIG. 2 to FIG. 5.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a special-purpose computer, an embedded processor, or a processor of any other programmable data processing device to generate a machine, so that the instructions executed by the computer or the processor of the another programmable data processing device generate an apparatus for implementing a specific function in one or more processes in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams. The computer program instructions may alternatively be loaded onto a computer or another programmable data processing device, so that a series of operations and steps are performed on the computer or the another programmable data processing device, to generate processing implemented by the computer.

It is clear that a person skilled in the art can make various modifications and variations to this application without departing from the spirit and scope of this application. This application is intended to cover the modifications and variations of this application provided that they fall within the scope of the claims and equivalent technologies of this application.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the processes or functions according to the embodiments of the present invention are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A method comprising:
    sending, by user equipment (UE), report information to a base station, wherein the report information comprises a detection result of one or more downlink reference signals configured for the UE for monitoring a radio link, or a status of a timer/counter corresponding to the one or more downlink reference signals for monitoring the radio link;
    receiving, by the UE, feedback information from the base station, wherein the feedback information comprises sending status information of the one or more downlink reference signals, and the sending status information indicates whether a downlink reference signal of the one or more downlink reference signals was sent by the base station; and
    adjusting, by the UE, a monitoring status of the radio link based on the feedback information and the report information.

2. The method according to claim 1, wherein the UE sends the report information to the base station when the UE does not detect the one or more downlink reference signals or when energy of at least one detected downlink reference signal is lower than a threshold.

3. The method according to claim 1, wherein the report information is represented in a bitmap form or using one-bit information.

4. The method according to claim 3, wherein the one-bit information indicates whether a downlink reference signal is not correctly received by the UE, or indicates whether the timer/counter corresponding to the one or more downlink reference signals is started.

5. The method according to claim 1, wherein the sending status information of the one or more downlink reference signals comprises that at least one of the one or more downlink reference signals is not sent by the base station because listen before talk (LBT) fails.

6. The method according to claim 1, wherein adjusting the monitoring status comprises:
    updating, by the UE, the timer/counter corresponding to the one or more downlink reference signals.

7. The method according to claim 1, further comprising:
    receiving, by the UE, configuration information from the base station, wherein the configuration information carries a parameter used to update the timer/counter corresponding to the one or more downlink reference signals.

8. A method comprising:
    receiving, by a base station, report information from user equipment (UE), wherein the report information comprises a detection result of one or more downlink reference signals configured for the UE for monitoring a radio link, or a status of a timer/counter corresponding to the one or more downlink reference signals for monitoring the radio link; and
    sending, by the base station, feedback information to the UE, wherein the feedback information comprises sending status information of the one or more downlink reference signals, and the sending status information indicates whether a downlink reference signal of the one or more downlink reference signals was sent by the base station, the feedback information enabling the UE to adjust a monitoring status of the radio link based on the feedback information and the report information.

9. The method according to claim 8, wherein the base station receives the report information from the UE when the UE does not detect at least one downlink reference signal or when energy of at least one detected downlink reference signal is lower than a threshold.

10. The method according to claim 8, wherein the report information is represented in a bitmap form or using one-bit information.

11. The method according to claim 10, wherein the one-bit information indicates whether a downlink reference signal is not correctly received by the UE, or indicates whether the timer/counter corresponding to the one or more downlink reference signals is started.

12. The method according to claim 8, wherein the sending status information of the one or more downlink reference signals comprises that at least one of the one or more downlink reference signals is not sent by the base station because listen before talk (LBT) fails.

13. The method according to claim 8, further comprising:
sending, by the base station, configuration information to the UE, wherein the configuration information carries a parameter used to update the timer/counter corresponding to the one or more downlink reference signals.

14. An apparatus comprising:
at least one processor; and
one or more non-transitory memories coupled to the at least one processor and storing a program that, when executed by the at least one processor, causes the apparatus to:
send report information to a base station, wherein the report information comprises a detection result of one or more downlink reference signals configured for the apparatus for monitoring a radio link, or a status of a timer/counter corresponding to the one or more downlink reference signals for monitoring the radio link;
receive feedback information from the base station, wherein the feedback information comprises sending status information of the one or more downlink reference signals, and the sending status information indicates whether a downlink reference signal of the one or more downlink reference signals was sent by the base station; and
adjusting a monitoring status of the radio link based on the feedback information and the report information.

15. The apparatus according to claim 14, wherein the report information is sent to the base station when the UE does not detect at least one downlink reference signal or when energy of at least one detected downlink reference signal is lower than a threshold.

16. The apparatus according to claim 14, wherein the report information is represented in a bitmap form or using one-bit information.

17. The apparatus according to claim 16, wherein the one-bit information indicates whether a downlink reference signal is not correctly received by the apparatus, or indicates whether the timer/counter corresponding to the one or more downlink reference signals is started.

18. The apparatus according to claim 14, wherein the sending status information of the one or more downlink reference signals comprises that at least one of the one or more downlink reference signals is not sent by the base station because listen before talk (LBT) fails.

19. The apparatus according to claim 14, the program, when executed by the at least one processor, causes the apparatus further to: update the timer/counter corresponding to the one or more downlink reference signals.

20. The apparatus according to claim 14, wherein the program, when executed by the at least one processor, causes the apparatus further to:
receive configuration information from the base station, wherein the configuration information carries a parameter used to update the timer/counter corresponding to the one or more downlink reference signals.

* * * * *